(12) United States Patent
Schudy et al.

(10) Patent No.: US 9,863,527 B2
(45) Date of Patent: Jan. 9, 2018

(54) MODULAR CONTROL DEVICE FOR A TRANSMISSION OF A COMMERCIAL VEHICLE

(71) Applicant: KNORR-BREMSE Systeme fuer Nutzfahrzeuge GmbH, Munich (DE)

(72) Inventors: Juergen Schudy, Munich (DE); Daniel Geis-Esser, Munich (DE)

(73) Assignee: KNORR-BREMSE Systeme fuer Nutzfahrzeuge GmbH, Munich ( * ) Notice: Subject to any disclaimer, the term of this patent is extended or adjusted under 35 U.S.C. 154(b) by 40 days.

(21) Appl. No.: 14/879,683

(22) Filed: Oct. 9, 2015

(65) Prior Publication Data

US 2016/0102754 A1    Apr. 14, 2016

(30) Foreign Application Priority Data

Oct. 10, 2014    (DE) .......................... 10 2014 114 730

(51) Int. Cl.
| F16H 63/04 | (2006.01) |
| F16H 61/00 | (2006.01) |
| F16H 63/24 | (2006.01) |
| F16H 57/00 | (2012.01) |
| F16H 61/30 | (2006.01) |

(52) U.S. Cl.
CPC ......... F16H 61/0003 (2013.01); F16H 63/24 (2013.01); F16H 63/04 (2013.01); F16H 2057/005 (2013.01); F16H 2061/308 (2013.01); Y10T 477/69363 (2015.01)

(58) Field of Classification Search
CPC ............. Y10T 477/69363; F16H 63/24; F16H 61/0003; F16H 2061/308; F16H 63/04

USPC ............................................. 475/134; 74/335
See application file for complete search history.

(56) References Cited

U.S. PATENT DOCUMENTS

| 6,568,515 | B2* | 5/2003 | Harries ................ F16D 48/066 |
| | | | 192/3.58 |
| 8,387,476 | B2* | 3/2013 | Buchanan ............... F16D 23/06 |
| | | | 74/335 |
| 8,429,993 | B2* | 4/2013 | Garabello ............... F16H 61/12 |
| | | | 192/3.54 |
| 8,578,800 | B2* | 11/2013 | Brandenburg ...... F16H 61/0031 |
| | | | 74/330 |
| 8,689,654 | B2* | 4/2014 | Yagi .................... F16H 61/0021 |
| | | | 74/330 |
| 2001/0009881 | A1 | 7/2001 | Albs et al. |

(Continued)

FOREIGN PATENT DOCUMENTS

DE    100 02 693 A1    7/2001

*Primary Examiner* — Roger L Pang
(74) *Attorney, Agent, or Firm* — Crowell & Moring LLP

(57) ABSTRACT

A control device is provided for a transmission having at least three shift actuators for the gear selection, a plurality of valves for actuating the shift actuators and a further plurality of valves for actuating the clutch. The shift actuators, the valves for actuating the shift actuators and the valves for actuating the clutch are combined in a common housing and that, within this housing, the shift actuators are grouped into a spatially connected shift group, the shift actuator valves are grouped into a spatially connected valve group and the clutch actuator valves are grouped into a further spatially connected valve group, wherein the shift group and the two valve groups and do not spatially overlap.

17 Claims, 2 Drawing Sheets

(56) References Cited

U.S. PATENT DOCUMENTS

| | | | | |
|---|---|---|---|---|
| 2005/0034955 A1* | 2/2005 | Meinhard | ............. | B60K 23/02 |
| | | | | 192/112 |
| 2006/0005647 A1* | 1/2006 | Braford | .............. | F16H 61/0009 |
| | | | | 74/335 |
| 2007/0028708 A1* | 2/2007 | Futamura | ........... | F16H 61/0206 |
| | | | | 74/335 |
| 2010/0099537 A1* | 4/2010 | Maten | ................ | F16H 61/2807 |
| | | | | 477/130 |

* cited by examiner

US 9,863,527 B2

MODULAR CONTROL DEVICE FOR A TRANSMISSION OF A COMMERCIAL VEHICLE

CROSS REFERENCE TO RELATED APPLICATION

This application claims priority under 35 U.S.C. §119 from German Patent Application No. 10 2014 114 730.8, filed Oct. 10, 2014, the entire disclosure of which is herein expressly incorporated by reference.

BACKGROUND AND SUMMARY OF THE INVENTION

The present invention relates to a control device for a transmission having a clutch unit for a commercial vehicle, including a transmission actuator for mechanically actuating the transmission and a clutch actuator for the fluidic actuation of a clutch unit.

The main area of application of the present invention is commercial (utility) vehicle manufacturing. A central feature of many transmissions of commercial vehicles, in particular of commercial vehicles for local and distribution transport, long-distance transport and also for overland and coach transport, is the group architecture with a plurality of gears. This architecture is increasingly used for automated manual transmissions (AMT) in commercial vehicles.

Transmissions for commercial vehicles may, in principle, have different levels of automation. In this instance, actuating the clutch and selecting the gear may be carried out in an automated manner, depending on the design of the start-up procedure. None of these processes are automated for a manual transmissions; for semi-automated transmissions, one of the processes is automated; and, for the fully automated transmission of interest here, all processes are automated. Hence, there is needed a suitable actuating device for an automated starting clutch, for an automated operating of a clutch when shifting gears and for an automated gear selection and engine management.

In a generally known manner, automated clutch operation and automated gear switching are enabled by using different power elements in the form of, for example, electropneumatic or electrohydraulic actuators. Within the framework of generally known automated transmissions, clutch actuators and transmission actuators are used, which are situated in or at the transmission.

A respective actuation device is, for example, disclosed in German publication DE 100 02 693 A1.

The object of the present invention is to further develop a generic actuating device in such a manner that, in the sense of a modular design, several different transmission variations of a common transmission family are able to be controlled by a largely equivalent actuating device.

This and other objects are achieved by a control device for a transmission having at least three shift actuators for gear selection, a plurality of valves for actuating the shift actuators and a further plurality of valves for actuating the clutch. The shift actuators, the valves for actuating the shift actuators and the valves for actuating the clutch are combined in a common housing. Within this housing, the shift actuators are grouped into a spatially connected shift group, the valves are grouped into a spatially connected valve group and the clutch valves are grouped into a further spatially connected valve group. The shift group and the two valve groups do not spatially overlap.

Within the framework of the present invention, a control device for a transmission has been developed. This control device includes at least three shift actuators for the gear selection, a plurality of valves for actuating the shift actuators and a further plurality of valves for actuating the clutch.

The valves are electrically actuated via a control device and release a defined fluidic volume flow as a control signal to the shift actuators and/or starting clutch. In this instance, pressurized air and hydraulic oil can substantially be named as possible fluids.

According to the present invention, the shift actuators, the valves for actuating the shift actuators and the valves for actuating the clutch are combined in a common housing, and, within this housing, the shift actuators are grouped into a spatially connected shift group;
the valves for actuating the shift actuators are grouped into a spatially connected valve group; and
the valves for actuating the clutch are grouped into a further spatially connected valve group, and the shift group and the two valve groups do not spatially overlap one another.

"Spatially not overlapping" is understood in the sense of the present invention in that—in reference to the figures—between elements of a group 8, 9 or 10, no element of another group 8, 9 or 10 fully or partially extends over. This is synonymous with a space between two elements of one group being always free of elements of another group.

Such design achieves that, when manufacturing different versions of the control device, the additional expense for manufacturing, which results from the differences between the versions vis-a-vis manufacturing only one version, is minimized. Furthermore, it becomes possible to retroactively upgrade an existing control device by installing additional shift actuators and/or valves.

Thus, it is possible by this design to combine the advantages, relevant to construction space and installation, of functional integration within a closed assembly with the commercial merits of a modular architecture for covering different target applications.

Particularly advantageous embodiments of the present invention include:

the shift group is formed by identically constructed shift actuators; and/or
the valve group for actuating the shift actuators is formed by identically constructed valves; and/or
the valve group for controlling the clutch is formed by identically constructed valves.

Then, starting from a standard version of the control device, which only includes a minimum of shift actuators and valves, further versions of the control device may be derived by taking advantage of as many constant components as possible. Ideally, the additional manufacturing expense for expanding the assembly by at least one additional shift actuator 6, inclusive of the respective expansions of valve system 8 for actuating the shift actuators, and/or for expanding valve system 9 for actuating a further starting clutch, may be substantially reduced so that a respective, specific actuating variant of housing components 2 of the standard version is manufactured.

Additional components not included in the standard version, for example, piston elements of a further cylinder and/or further valves 8g, 8h for actuating the shift actuators or valves 9e, 9f, 9g, 9h for controlling the clutch, in this instance, represent an assembly variant. Further, within the framework of a specific assembly variant, components included in the standard version may be omitted. This, for example, could be valves of valve group 8 for controlling the shift actuators or valves of valve group 9 for controlling the clutch. By dividing the space according to the present invention within housing 2 into functional groups 10, 8 and 9, all assembly modifications may be carried out independently from one another and do not affect one another.

In a further particularly advantageous embodiment of the present invention, the installation space within housing 2 provided for shift group 10 includes an expansion space 10a for receiving at least one additional shift actuator 6. In a further particularly advantageous embodiment of the present invention, the installation space within housing 2 provided for valve group 8 includes an expansion space 81 for receiving at least one additional valve 8g, 8h. In a further particularly advantageous embodiment of the present invention, the installation space within housing 2 provided for valve group 9 includes an expansion space 91 for receiving at least one additional valve 9e, 9f, 9g, 9h. These embodiments share the advantage that the assembly modifications may be carried out in a particularly simple manner. In particular, a housing 2 having identical dimensions, which respectively is only assembled in a different manner, may be used for a plurality of versions of control device 1, for example, having a different number of electrical, mechanical, pneumatic or hydraulic implementations.

In this instance, the standard version, as well as versions derived from the standard version according to the present invention, may have further characteristics or include further functions and elements in the sense of advantageous embodiments.

For this reason, the included shift actuators 3, 4, 5, 6, 7 are situated axially parallel to enable an actuation of the interior shift elements in the transmission free of transverse forces.

Further, in order to synchronize shafts present in the transmission, it may be necessary to actuate a shaft brake integrated for this purpose in the transmission. Valve device 200 necessary for this purpose may be advantageously integrated into control device 1.

For detecting and/or validating the position, the shift actuators may be advantageously provided with linear position transducers 35, 45, 55.

For packaging reasons, it may be appropriate that one or a plurality of speed sensors 300 for determining the shaft speed in the transmission are integrated into the assembly of control device 1.

In order to maximize the constant components, it is appropriate to recycle a transmission control electronics from an existing component set for electronically actuating control device 1. Then, it may be the case that shift group 10, valve group 8 for actuating the shift actuators and/or valve group 9 for controlling the clutch in total require more power for actuating the (magnetic) valves than the control electronics is able to provide. In order to make control device 1 compatible with a class of control electronics as broad as possible, at least one current amplifying electronic power output stage 100 is hence provided for shift group 10, for valve group 8 and/or for valve group 9.

In an advantageous embodiment of the present invention, valve group 9 for actuating the clutch actuator is designed to actuate one or a plurality of external clutch actuators, which have an axis offset to the gear shaft, or of a single or multiple central release bearing. In particular, valve group 9 may be designed in a standard version of control device 1 for actuating an individual external clutch actuator or a single central release bearing; however, in an expanded version, valve group 9 may be designed for actuating two external clutch actuators or a dual central release bearing.

In the sense of a most optimal functional integration, it may be appropriate as a function of the gear architecture of the target application that at least one shift fork 34, 44, 54 of the shift forks of shift actuators 3, 4, 5 is situated within shift group 10 and, for this reason, also within housing 2.

For shift actuators 3, 4, 5, in which shift forks 34, 44, 45 are situated within housing 2 and, thus, are an immediate component of the assembly of control device 1, the bending moment acting upon the shift forks, resulting from the axis being offset between the actuating axis of the shift fork and the effective axis of the shift fork, may result in a bending of piston rods 32, 42, 52 of shift actuators 3, 4, 5. In order to reduce this bending, which may negatively affect the wear and leakage behavior of shift actuators 3, 4, 5, the shift fork (34, 44, 54) is, for this reason, in a further particularly advantageous embodiment of the present invention, axially fixed to the piston rod (32, 42, 52) of a shift actuator, and this piston rod is on both sides of the shift fork mounted axially movable against the housing (2).

Furthermore, in a further advantageous embodiment of the present invention, the degree of functional integration is further increased in that at least one additional shift actuator 7 for selecting the range group of a multi-range transmission is situated within the housing 2.

This further shift actuator 7, in particular, may be connected via a mechanical coupling point to a shift rod in the transmission. This coupling point is furthermore connected to the respective interior shift element of the transmission. Since the interior shift elements for shifting the range group are typically situated in the far back of the transmission, it appears appropriate to abstain, specifically for the additional shift actuators for selecting the range, from the integration of the shift forks and to instead provide mechanical coupling point 76 at the piston rod of this shift actuator.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
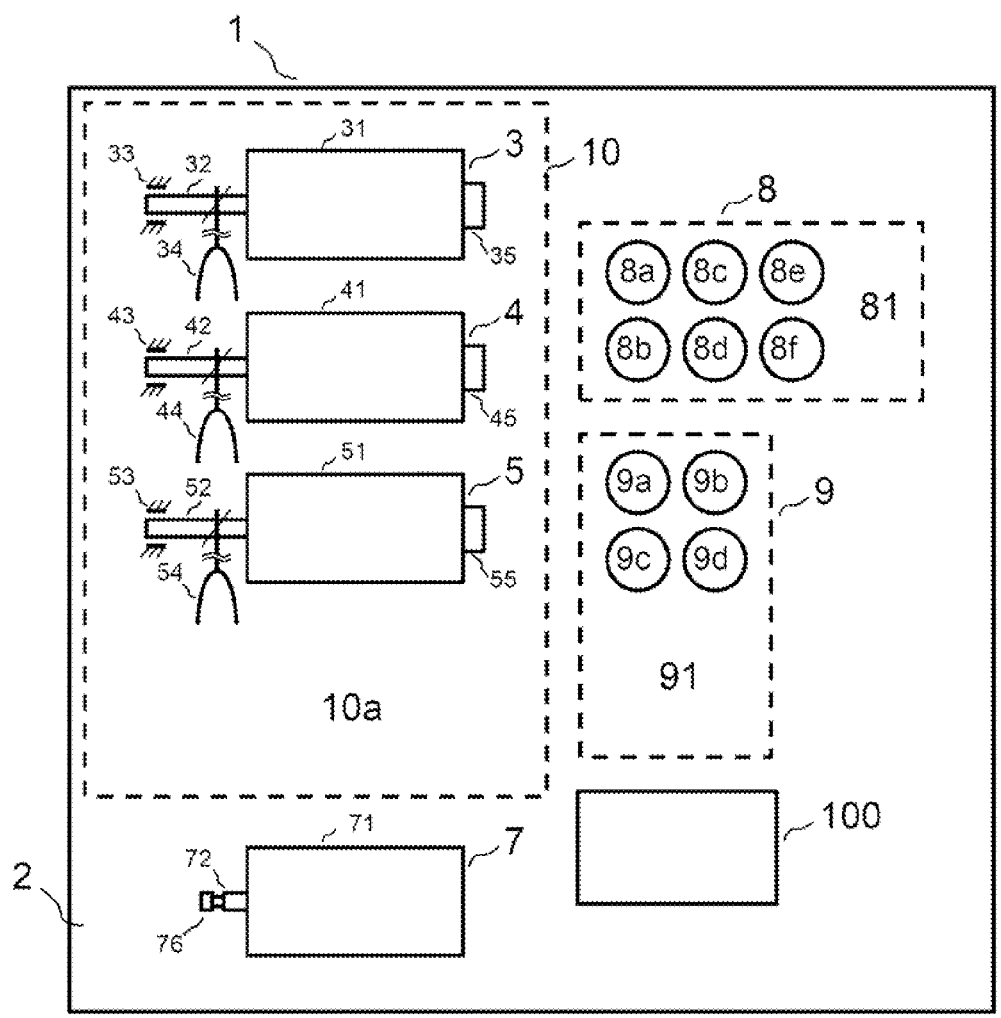
FIG. 1 is a schematic diagram showing a standard version of control device 1 according to an embodiment of the present invention.

FIG. 1 shows an exemplary embodiment for a standard version of control device 1 according to the present invention for a shiftable transmission, preferably for a commercial vehicle. In this instance, such a control device 1 includes at least three shift actuators 3, 4, 5 for selecting the gear, a plurality of valves (here, six valves 8a, 8b, 8c, 8d, 8e, 8f) for actuating the shift actuators and a further plurality of valves (here, 9a, 9b, 9c, 9d) for actuating the clutch.

Shift actuators 3, 4, 5 are identically constructed and each include respectively one cylinder housing 31, 41, 51. One piston rod 32, 42, 52 is movably mounted between the cylinder housing 31, 41, 51 and a corresponding outer bearing point 33, 43, 53 so that it may be moved along its longitudinal axis when actuating the shift actuator. In the event of such a displacement, piston rods 32, 42, 52 operate a corresponding shift fork 34, 44, 54 for selecting the gear, which here is integrated in the control device (1). The displacement of piston rods 32, 42, 52 may be monitored by a corresponding linear position transducer 35, 45, 55.

Shift actuators 3, 4, 5, valves 8a, 8b, 8c, 8d, 8e, 8f and valves 9a, 9b, 9c, 9d are combined in a common housing 2. Within this housing, the shift actuators are grouped into a spatially connected shift group 10. Valves 8a, 8b, 8c, 8d, 8e, 8f are grouped into a first spatially connected valve group 8 and valves 9a, 9b, 9c, 9d are grouped into a second spatially connected valve group 9. Shift group 10 and valve groups 8 and 9 do not overlap spatially, that is, one and the same space within housing 2 always belongs to one of these three functional groups.

Figure 2:
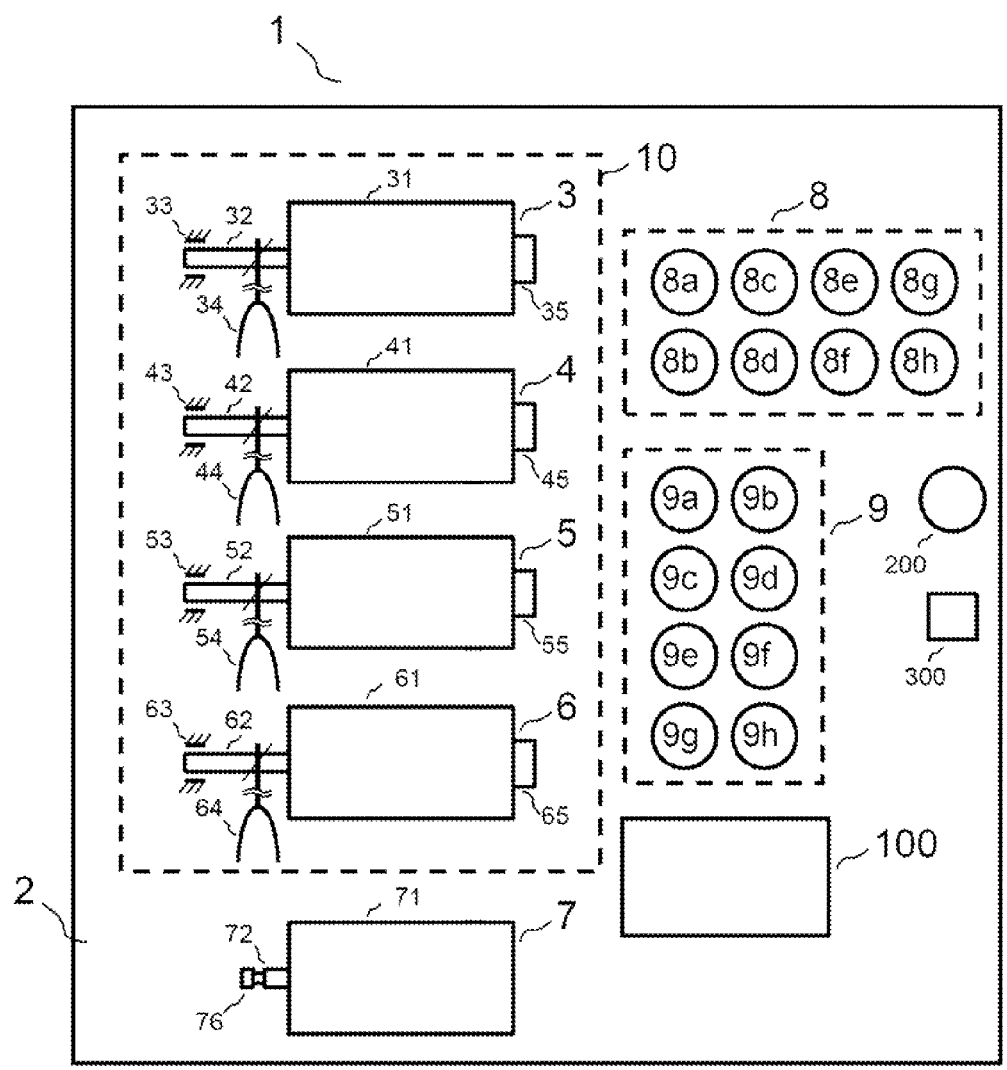
FIG. 2 is a schematic diagram showing an expanded version of control device 1 according to an embodiment of the present invention.

In addition to shift actuators 3, 4, 5, shift group 10 includes an expansion space 10a, which is unoccupied in this standard version, and which is able to receive a further shift actuator (see FIG. 2). In addition to valves 8a, 8b, 8c, 8d, 8e, 8f, valve group 8 includes an expansion space 81, which is unoccupied in this standard version, and which is able to receive further valves. Similarly, valve group 9 in addition to valves 9a, 9b, 9c, 9d, also includes an expansion space 91, which is able to receive further valves.

A further shift actuator 7 is integrated into housing 2. It operates the range group of the multi-range transmission present here and, for this reason, is of a different type than shift actuators 3, 4, 5, of shift group 10. It includes a cylinder housing 71 in which a piston rod 72 is movably mounted along its axis (thus, also along the axis of cylinder 71). This displacement is outcoupled via a mechanical coupling point 76 and causes the range selection.

Finally, housing 2 also includes an electronic power output stage 100 for supplying power to control device 1.

This described minimum configuration may be used as control device 1 for an automated transmission having a starting clutch.

In contrast to the standard version illustrated in FIG. 1, FIG. 2 shows an expanded version of control device 1. Expansion space 10a provided in the standard version in shift group 10 is filled with a further shift actuator 6. Expansion space 81 provided in the standard version in valve group 8 for actuating the shift actuators is filled with further valves 8g, 8h. Similarly, expansion space 91 provided in the standard version in valve group 9 for controlling the clutch is filled with further valves 9e, 9f, 9g, 9h. This expanded version of control device 1 is accommodated in the same housing 2 as in the standard version. Correspondingly, this housing 2 is considered to be substantially identical during manufacturing. It is only to be assembled differently and provided with a modified number of implementations.

Additionally a valve device 200 for actuating a transmission shaft brake and a speed sensor 300 are integrated in the expanded version of control device 1.

LIST OF REFERENCE CHARACTERS

1 Control device
2 Housing
3, 4, 5, 6, 7 Shift actuators
8a-h Valves for actuating shift actuators
8 Group of valves for actuating shift actuators
8l Expansion space in group 8
9a-h Valves for actuating the clutch
9 Group of valves for actuating the clutch
9l Expansion space in group 9
10 Shift group
10a Expansion space in the shift group
31, 41, 51, 61, 71 Cylinder housing
32, 42, 52, 62, 72 Piston rods
33, 43, 53, 63, 73 Outer bearing points of the piston rod
34, 44, 54, 64 Shift forks
35, 45, 55, 65 Linear position transducers
76 Mechanical coupling point
100 Electronic power output stage
200 Valve device
300 Speed sensor for determining the shaft speed The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for a transmission, comprising:
   at least three shift actuators for gear selection;
   a first plurality of valves for actuating the shift actuators;
   a second plurality of valves for actuating a clutch of the transmission; and
   a common housing in which the at least three shift actuators, the first plurality of valves for actuating the shift actuators and the second plurality of valves for actuating the clutch are combined, wherein
   within the common housing, the shift actuators are grouped into a spatially connected shift group,
   the first plurality of valves are grouped into a first spatially connected valve group,
   the second plurality of valves are grouped into a second spatially connected valve group,
   the shift group and the first and second spatially connected valve groups do not spatially overlap, and
   the at least three shift actuators are arranged axially parallel to one another.

2. The control device according to claim 1, wherein the shift group comprises identically constructed shift actuators.

3. The control device according to claim 2, wherein the first valve group for actuating the shift actuators comprises identically constructed valves.

4. The control device according to claim 3, wherein the second valve group for actuating the clutch comprises identically constructed valves.

5. The control device according to claim 1, wherein installation space within the housing provided for the shift group comprises an expansion space configured to receive at least one additional shift actuator.

6. The control device according to claim 1, wherein an installation space within the housing provided for the first valve group comprises an expansion space configured to receive at least one additional valve for the first valve group.

7. The control device according to claim 1, wherein an installation space within the housing provided for the second valve group comprises an expansion space configured to receive at least one additional valve for the second valve group.

8. The control device according to claim 1, further comprising a transmission shaft brake actuating valve device for actuating a transmission shaft brake, the transmission shaft brake valve device being integrated into the control device.

9. The control device according to claim 1, wherein each of the at least three shift actuators have a respective linear position transducer.

10. The control device according to claim 1, further comprising at least one speed sensor integrated in an assembly of the control device.

11. The control device according to claim 1, further comprising at least one current amplifying electronic power output stage, the electronic power outlet stage being provided in a power supply for the shift group, the first valve group, and/or the second valve group.

12. The control device according to claim 1, wherein the second valve group for actuating the clutch is configured to actuate one or more external clutch actuators, said actuators having an axis offset to a gear shaft.

13. The control device according to claim 1, wherein the second valve group for actuating the clutch is configured to actuate a single or dual central release bearing.

14. The control device according to claim 1, wherein at least one shift fork of each of the three actuators is arranged within the shift group.

15. The control device according to claim 14, wherein the shift fork within the shift group is axially fixed to a respective piston rod of a respective shift actuator, the piston rod being mounted axially movable on both sides of the shift fork relative to the housing.

16. The control device according to claim 1, further comprising at least one further shift actuator for selecting a range group of a multi-range transmission, the at least one further actuator being arranged within the common housing.

17. The control device according to claim 16, wherein the at least one further shift actuator is connected via a mechanical coupling point to a shift rod in the transmission.

* * * * *